US009169735B2

(12) United States Patent
Stamps

(10) Patent No.: US 9,169,735 B2
(45) Date of Patent: Oct. 27, 2015

(54) BLADE-PITCH CONTROL SYSTEM WITH FEEDBACK SWASHPLATE

(75) Inventor: Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 514 days.

(21) Appl. No.: 13/699,785

(22) PCT Filed: May 20, 2011

(86) PCT No.: PCT/US2011/037395
§ 371 (c)(1),
(2), (4) Date: Nov. 26, 2012

(87) PCT Pub. No.: WO2012/161680
PCT Pub. Date: Nov. 29, 2012

(65) Prior Publication Data
US 2013/0136596 A1   May 30, 2013

(51) Int. Cl.
*B64C 11/38* (2006.01)
*F01D 7/00* (2006.01)
*B64C 11/06* (2006.01)
*B64C 11/32* (2006.01)
*F04D 29/36* (2006.01)
*B64C 27/605* (2006.01)

(52) U.S. Cl.
CPC . *F01D 7/00* (2013.01); *B64C 11/06* (2013.01); *B64C 11/32* (2013.01); *B64C 27/605* (2013.01); *F04D 29/362* (2013.01)

(58) Field of Classification Search
CPC ....... F04D 29/396; B64C 11/06; B64C 11/32; B64C 27/605
USPC .......................................... 416/148, 149, 159
See application file for complete search history.

(56) References Cited

U.S. PATENT DOCUMENTS

| 2,969,117 A | * | 1/1961 | Schon ........................... 416/114 |
| 3,134,444 A | * | 5/1964 | Egerton et al. .................. 416/24 |
| 3,428,132 A | * | 2/1969 | Vacca Luigi et al. ......... 416/143 |
| 3,999,726 A | | 12/1976 | Carlson et al. |
| 6,032,899 A | * | 3/2000 | Mondet et al. ............. 244/17.25 |

(Continued)

FOREIGN PATENT DOCUMENTS

DE   1270409 B   6/1968

OTHER PUBLICATIONS

Extended European Search Report in related European patent application No. 11866409, mailed Nov. 20, 2013, 5 pages.
International Search Report and the Written Opinion of the International Searching Authority mailed by ISA/USA, U.S. Patent and Trademark Office on Feb. 9, 2012 for International Patent Application No. PCT/US11/037395, 10 pages.

*Primary Examiner* — Ninh H Nguyen
(74) *Attorney, Agent, or Firm* — James E. Walton

(57) ABSTRACT

A blade-pitch control system for controlling a pitch angle of blades on a rotor has an input swashplate assembly having non-rotating and rotating portions, the rotating portion being operably connected to blade grips. A feedback swashplate assembly has non-rotating and rotating portions, the rotating portion being connected to the yoke for movement with the yoke during flapping of the yoke. Linear actuators connect the non-rotating portion of the input swashplate assembly to the non-rotating portion of the feedback swashplate assembly. Motion of the yoke during flapping causes a corresponding motion of the feedback swashplate assembly and input swashplate assembly for providing selected pitch-flap coupling between flapping motion of the yoke and pitch motion of the grips.

20 Claims, 5 Drawing Sheets

(56) References Cited

U.S. PATENT DOCUMENTS 6,231,005 B1 5/2001 Costes
6,616,095 B2 9/2003 Stamps et al.
2010/0021301 A1 1/2010 Stamps et al.
2011/0280727 A1 11/2011 Stamps et al.

* cited by examiner

BLADE-PITCH CONTROL SYSTEM WITH FEEDBACK SWASHPLATE

TECHNICAL FIELD

The technical field is blade-pitch control systems for aircraft rotors.

DESCRIPTION OF THE PRIOR ART

Rotary-wing aircraft, such as helicopters and tiltrotors, have at least one rotor for providing lift and propulsion forces. These rotors have at least two airfoil blades connected to a hub, and the hub is mounted on a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control. In addition, the swashplate assembly may provide for cyclic control through tilting of the swashplate assembly about axes perpendicular to the mast axis.

When the swashplate moves toward or away from the rotor, the pitch angle of each blade changes by the same amount, and in the same direction, as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

Although great strides have been made in the art of blade-pitch control systems, significant shortcomings remain.

DESCRIPTION OF THE PREFERRED EMBODIMENT

Figure 1:
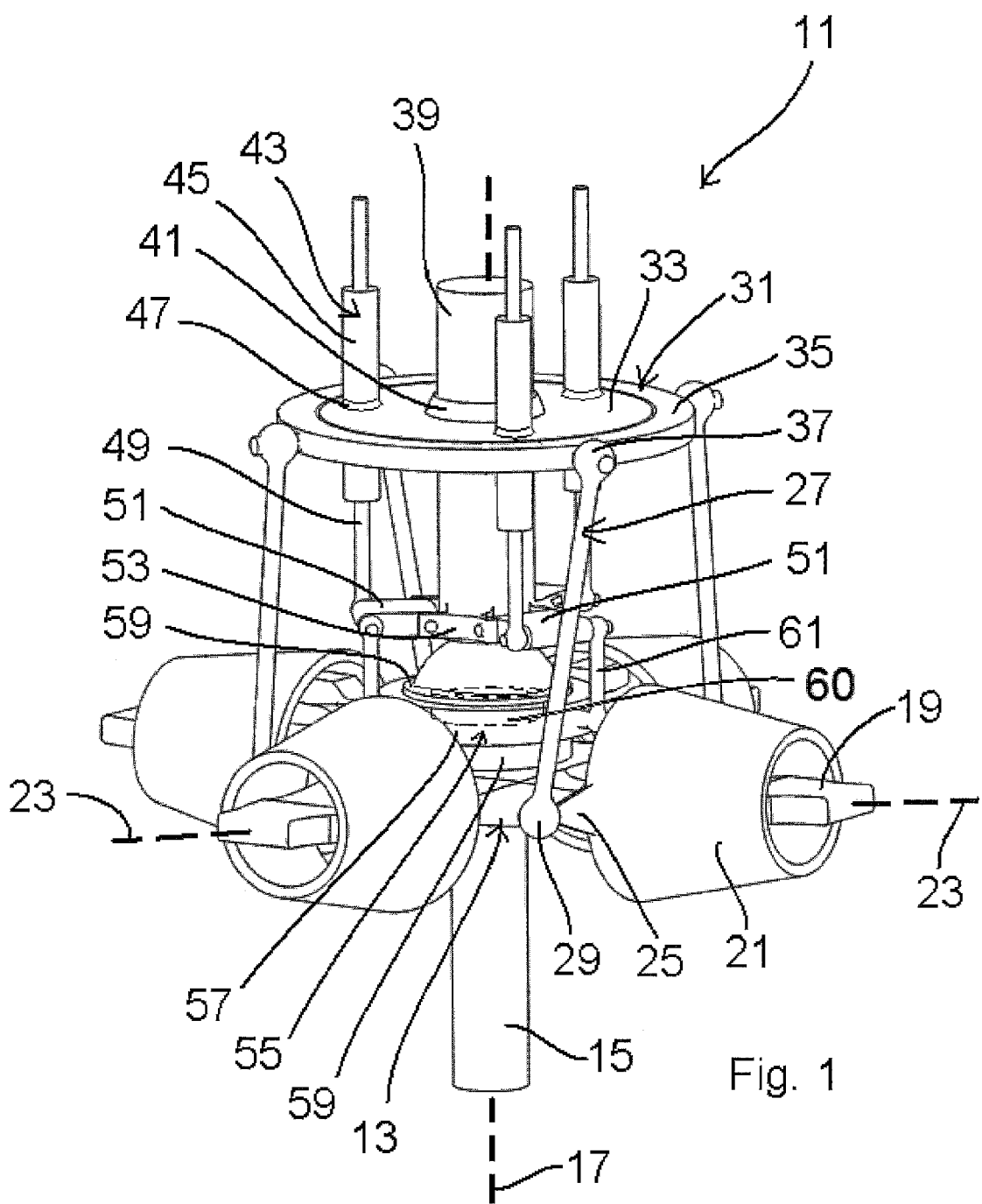
FIG. 1 is an oblique view of a rotor hub assembly comprising an embodiment of a blade-pitch control system.

Blade-pitch control systems for aircraft rotors, as described herein, provide for control of the pitch angle of blades attached to the rotor and provide for a feedback system within the pitch control systems.

Hub assemblies for a rotor of a tiltrotor aircraft are shown in a generally vertical orientation in the drawings, which is the orientation of the rotor assembly when the tiltrotor is configured for rotor-borne flight while in helicopter mode. In the following description, components of the assembly may be described in relation to this orientation in the drawings, though it should be understood that this is for descriptive purposes only, as the orientation of the assembly will change during use.

Figure 2:
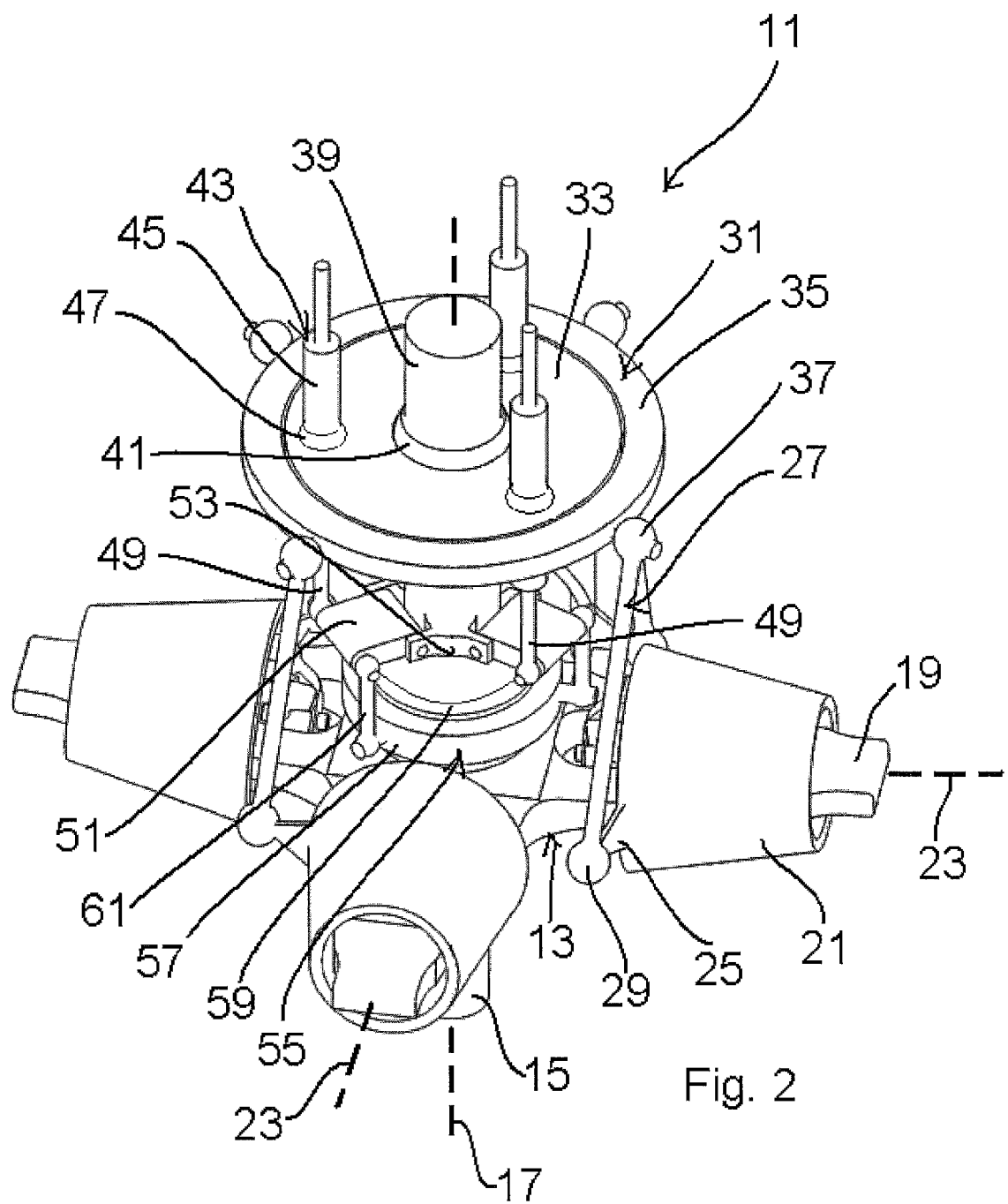
FIG. 2 is an oblique view of the rotor hub assembly of FIG. 1.

Referring to FIGS. 1 and 2, a tiltrotor hub assembly 11 comprises a central yoke 13 rotatably mounted to mast 15 with a U-joint (not shown). Yoke 13 is able to pivot about flap axes in a plane perpendicular to axis 17 of mast 15 while mast drives yoke 13 in rotation with mast 15 about mast axis 17. Flapping motion occurs due to the imbalance of lift between advancing and retreating blades, such as during forward motion of the aircraft, causing yoke 13 to pivot relative to mast 15 about the flap axes.

Yoke 13 comprises multiple arms 19 extending generally radially from the central region of yoke 13. A blade grip 21 is rotatably mounted to each arm 19, such that each grip 21 is rotatable relative to the associated arm 19 about a corresponding pitch axis 23 (two are shown). Grips 21 are configured for attachment of a rotor blade (not shown). A fixed pitch horn 25 extends from an inner portion of each grip 21, and a rigid pitch link 27 is rotatably connected to each pitch horn 25 at pitch link end 29. This configuration allows for movement of a pitch link 27 in directions generally parallel to mast axis 17 to cause rotation of the associated grip 21 and attached blade about the corresponding pitch axis 23.

An input swashplate assembly 31 comprises an inner non-rotating swashplate 33 and a coaxial and coplanar outer rotating ring 35, which is rotatably attached to swashplate 33 with bearings in a manner that allows ring 35 to freely rotate relative to swashplate 33 while providing for transfer of mechanical forces (other than torsional forces about their shared axis) between swashplate 33 and ring 35. Input swashplate assembly 31 is located above, or outboard, of yoke 13 along mast axis 17. Each pitch link 27 is rotatably attached at pitch link end 37 to ring 35, allowing for the transfer of mechanical forces between swashplate assembly 31 and grips 21.

A tubular central member 39 is rotatably carried on mast 15, so that mast 15 may rotate while central member 39 remains in a fixed angular orientation about mast axis 17. Swashplate 33 is rotatably mounted to central member 39 on spherical bearing 41, allowing swashplate assembly 31 to pivot about axes perpendicular to mast axis 17 in the same manner as yoke 13 pivots about the flap axes. Unlike yoke 13, which is rotatably mounted to a fixed location along the length of mast 15, swashplate assembly 31 and spherical bearing 41 are configured to translate along the length of mast 13 during operation.

Linear actuators 43 are rotatably mounted in an equally-spaced array on swashplate 33, a body 45 of each actuator 43 being mounted with a spherical bearing 47 for allowing actuators 43 to freely pivot relative to swashplate 33 about a center of rotation in the plane of swashplate 33. An actuator rod 49 extends from body 45 and is capable of selective movement relative to body 45 in response to commands from a pilot or a flight control system (FCS). Actuators 43 may be of any suitable type, including hydraulic actuation, electric actuation, or a combination. Each rod 49 is rotatably connected to an associated idler 51, which is rotatably mounted to central member 39 at a bracket 53. Each idler 51 is free to pivot about an axis defined by the associated bracket 53, the axis being generally perpendicular to mast axis 17 and spaced radially from axis 17.

A feedback swashplate assembly 55 comprises a non-rotating swashplate ring 57 and a coaxial and coplanar rotating ring 59. Rotating ring 59 is rotatably mounted to mast 15 with a U-joint 60 (shown obscured and in phantom) for rotation with mast about mast axis 17 while allowing for pivoting of rotating ring 59 about the flap axes of yoke 13. Swashplate ring 57 is rotationally mounted with bearings to rotating ring 59 to allow rotating ring 59 to freely rotate relative to ring 57 while providing for transfer of mechanical forces (other than torsional forces about their shared axis) between ring 57 and rotating portion 59. Rotating ring 59 is connected to yoke 13 with U-joint 60, so that feedback swashplate assembly 55 pivots together with yoke 13 as yoke 13 pivots about the flap axes. Rigid idler links 61 are each rotatably connected at one end to an idler 51 and at the opposing end to swashplate ring 55

It should be noted that desired kinematic relationships between the components of assembly 11 will determine the location of individual items. For example, it may be desirable to locate brackets 53 for idlers 51 at a position along mast axis 17 different than the position shown in the figures. It may also be desirable to locate the axis of rotation of idlers closer or father from mast axis 17. Likewise, the location where pitch link end 37 connects to ring 35 may be altered to change the angle of pitch link 27 relative to the remainder of assembly 11. Another example of a modification is that the length of pitch link 27 may be changed from that shown. While several of the possible changes have been described, this list is not exhaustive, and it will be clear to those skilled in the art that the kinematic relationships may be altered in many ways for optimization of the assembly to a specific application.

During operation, control inputs from the pilot or a FCS selectively extend or retract rods 49 of actuators 43. Simultaneous and identical motion in all of actuators 43 causes translation of input swashplate assembly 31 relative to central member 39 along mast axis 17, whereas dissimilar motion of actuators 43 causes tilting of input swashplate assembly 31 relative to central member 39 about an axis perpendicular to mast axis 17. When the rotor flaps, yoke 13 pivots about the flap axes, and this motion is transferred to rotating portion 59 of feedback swashplate assembly 55. This motion is transferred from rotating ring 59 to idlers 51 through idler links 61. Idlers 51 transfer the motion to rods 49 of actuators 43, and the motion is transferred into non-rotating swashplate 33 and outer rotating ring 35. Pitch links 27 then transfer the motion to grips 21 through pitch horns 25. In this manner, flap motion of yoke 13 creates a change in the pitch of grips 21 and the attached blades. The amount of pitch-flap coupling, known as delta-3, is determined by the various angles and lengths incorporated l the specific design, which will vary based on the specific application. This system is especially useful for a tiltrotor aircraft, as the system provides the required delta-3 control input to the rotor for stability when the tiltrotor is configured for wing-borne flight while in airplane mode. In addition, the pitch-cone coupling, known as delta-3, in the system can also be selected through placement of pitch horns 25 of grips 21.

Figure 3:
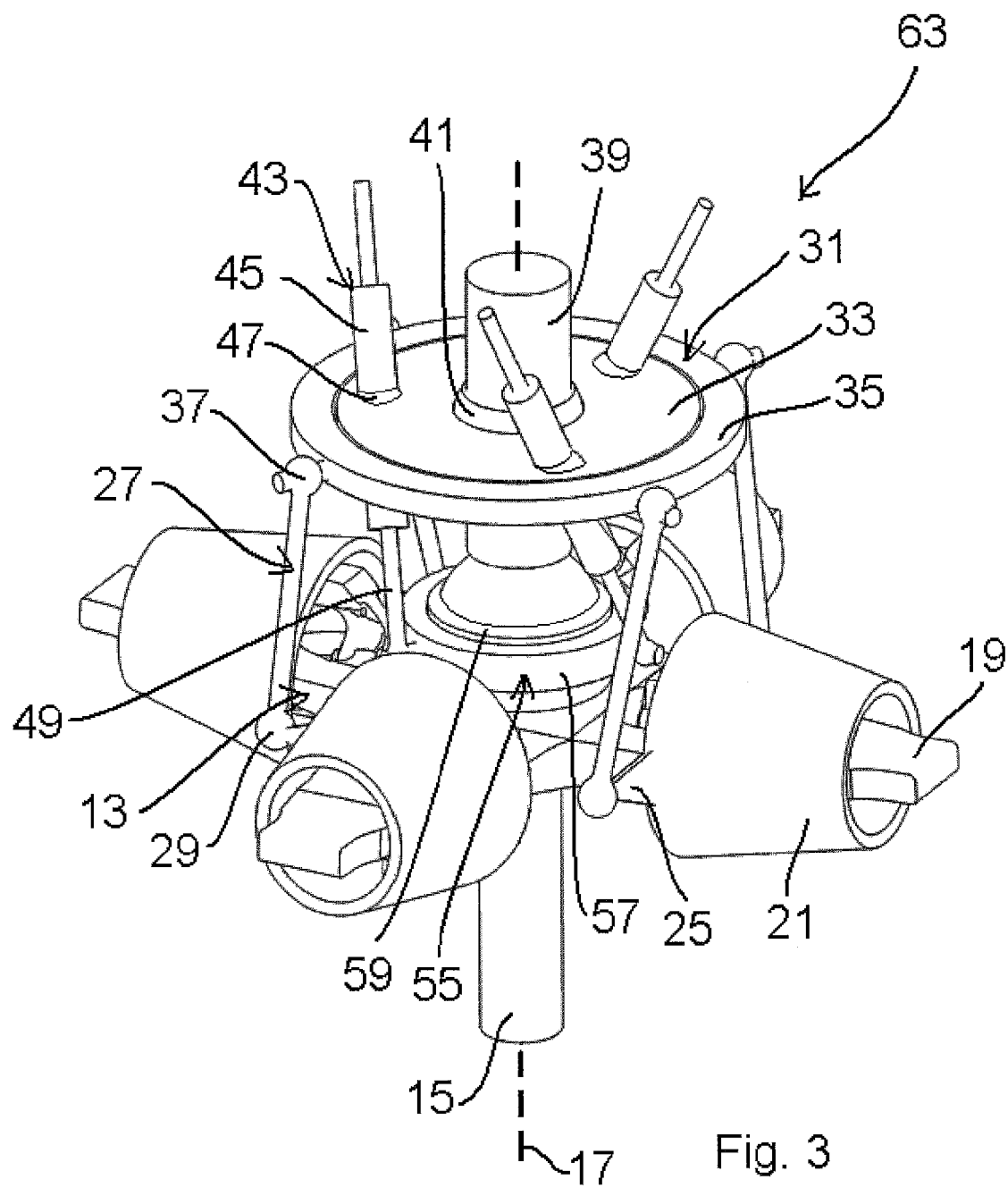
FIG. 3 is an oblique view of a rotor hub assembly comprising another embodiment of a blade-pitch control system.

FIG. 3 shows another embodiment of a tiltrotor hub assembly 63, comprising a central yoke 13 rotatably mounted to mast 15 for allowing yoke 13 to pivot about flap axes perpendicular to the axis 17 of mast 15 while mast drives yoke 13 in rotation with mast 15 about mast axis 17. Grips 21 are rotatably mounted to arms 19, and grips 21 are configured for attachment of a rotor blade (not shown). A rigid pitch link 27 connects each pitch horn 25 a rotating ring 35 of swashplate assembly 31. Central member 39 is rotatably carried on mast 15, and swashplate 33 is rotatably mounted to central member 39 on spherical bearing 41. Linear actuators 43 are rotatably mounted on swashplate 33, and an actuator rod 49 extends from each body 45 and is capable of selective movement relative to body 45 in response to commands from a pilot or a FCS. As in hub assembly 11, as described above, input swashplate assembly 31 is located above, or outboard, of yoke 13 along mast axis 17.

Unlike the system in hub assembly 11, in assembly 63 each rod 49 is rotatably connected directly to non-rotating swashplate ring 57 of feedback swashplate assembly 55, and no idler is used. Rotating ring 59 is connected to yoke 13, so that feedback swashplate assembly 55 pivots together with yoke 13 as yoke 13 pivots about the flap axes.

The blade-pitch control system of hub assembly 63 operates in substantially the same manner as that in assembly 11, with inputs from a pilot or a FCS operating actuators 43. However, actuators 43 are directly connected to non-rotating ring 57 of feedback swashplate 55, and this requires actuators 43 to be positioned at an angle relative to mast axis 17, whereas actuators 43 in assembly 11 were generally parallel to mast axis 17. While this may have a slightly detrimental effect on performance of the system, advantages of the system of assembly 63 include a reduced length, a more compact assembly, a reduced part count, and reduced weight. Flapping of yoke 13 provides feedback input into the system as described above.

Figure 4:
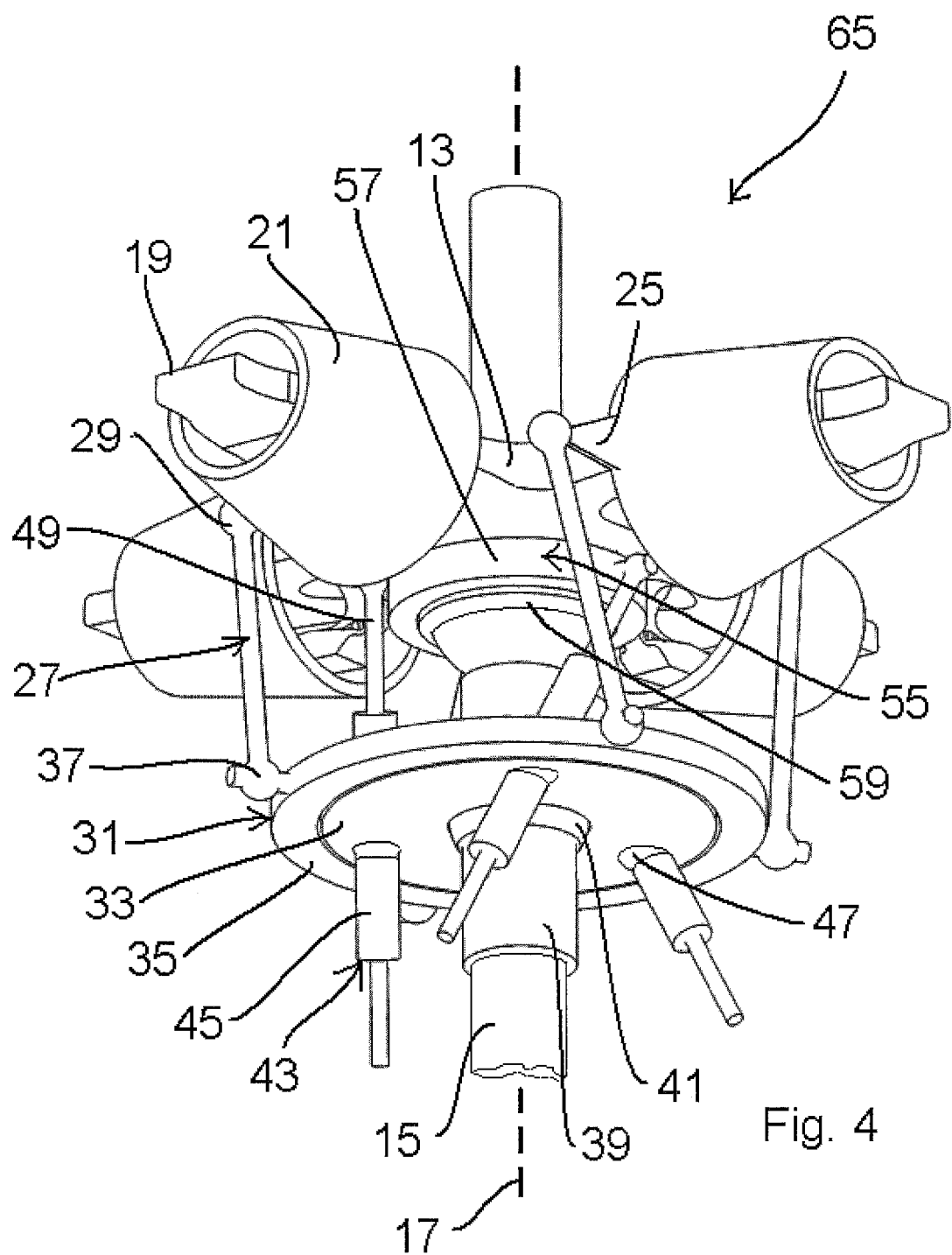
FIG. 4 is an oblique view of a rotor hub assembly comprising another embodiment of a blade-pitch control system.

FIG. 4 shows another embodiment of a tiltrotor hub assembly 65, comprising a central yoke 13 rotatably mounted to mast 15 for allowing yoke 13 to pivot about flap axes perpendicular to the axis 17 of mast 15 while mast drives yoke 13 in rotation with mast 15 about mast axis 17. Grips 21 are rotatably mounted to arms 19, and grips 21 are configured for attachment of a rotor blade (not shown). Like the systems in assemblies 11, 63, as described above, rigid pitch link 27 connects each pitch horn 25 a rotating ring 35 of input swashplate assembly 31. However, swashplate assembly 31 is located below, or inboard, of yoke 13, which is between yoke 13 and an engine or gearbox for rotating mast 15. Central member 39 is rotatably carried on mast 15, and swashplate 33 is rotatably mounted to central member 39 on spherical bearing 41. Linear actuators 43 are rotatably mounted on swashplate 33, and an actuator rod 49 extends from each body 45 and is capable of selective movement relative to body 45 in response to commands from a pilot or a FCS.

Like the system in hub assembly 63, as described above, in assembly 65 each rod 49 is rotatably connected directly to non-rotating swashplate ring 57 of feedback swashplate assembly 55, and no idler is used. Rotating ring 59 is connected to yoke 13, so that feedback swashplate assembly 55 pivots together with yoke 13 as yoke 13 pivots about the flap axes.

The blade-pitch control system of hub assembly 65 operates in substantially the same manner as that in assembly 63, with inputs from a pilot or a FCS operating actuators 43 and flapping feedback from yoke 13. However, actuators 43 are directly connected to non-rotating ring 57 of feedback swashplate 55, and this requires actuators 43 to be positioned at an angle relative to mast axis 17. The system of assembly 65 has advantages similar to those of the system of assembly 63, but the alternative placement of input swashplate assembly 31 may provide for better packaging in certain applications.

Figure 5:
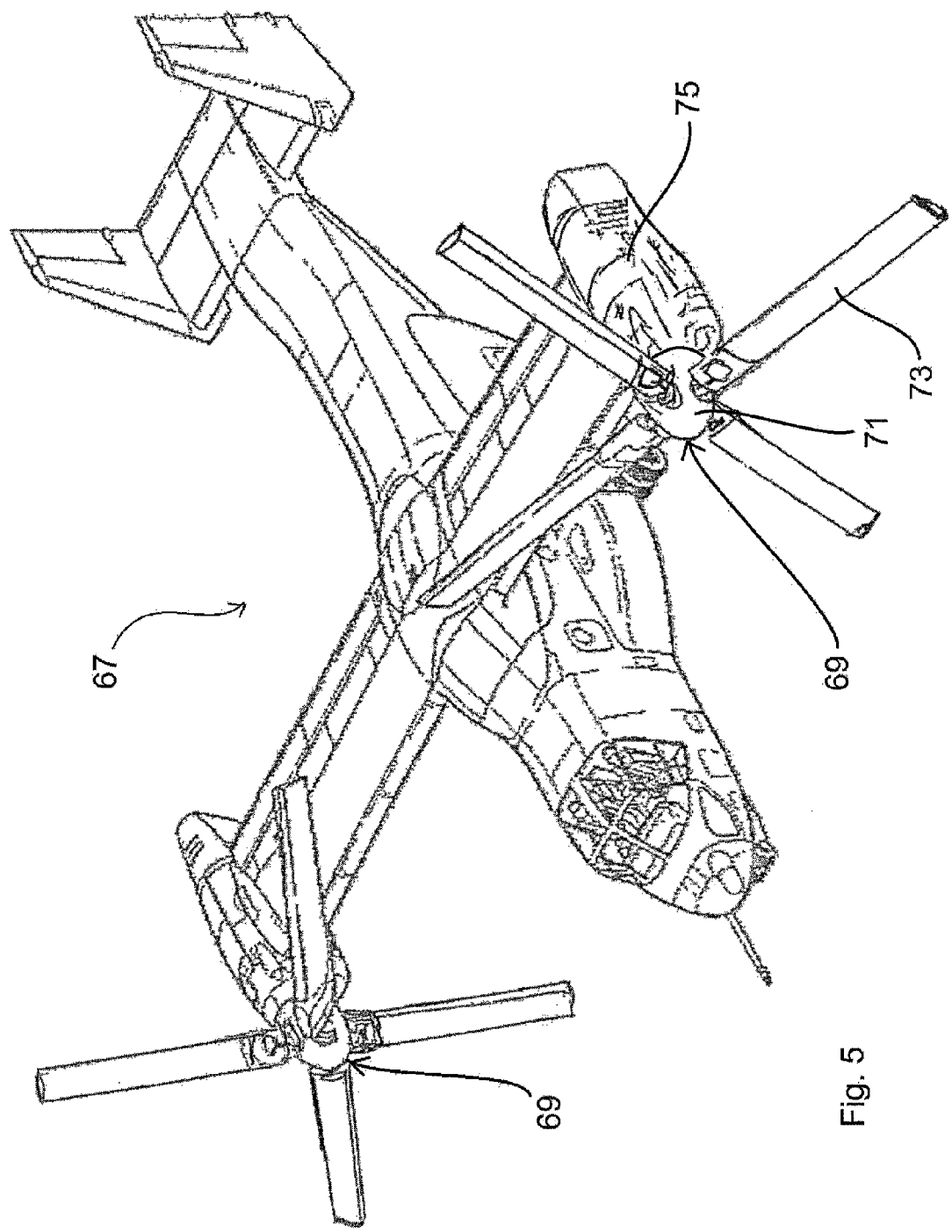
FIG. 5 is an oblique view of an aircraft having a blade-pitch control system with a feedback swashplate.

FIG. 5 shows a tiltrotor aircraft 67 having two rotors 69, and each rotor 69 comprises a central rotor hub assembly (not shown) housed under an aerodynamic cover 71. The hub assembly of each rotor 69 connects blades 73 to a mast (not shown), the mast being driven by the torque from an engine located in each nacelle 75. Each rotor hub assembly has a blade-pitch control system with a feedback swashplate, such as assemblies 11, 63, and 65, which are shown and described above.

The blade-pitch control system with feedback swashplate provides for several advantages, including: (1) a method for introducing flap motions into the control system as feedback, and (2) a reduced size of components necessary for control of blade pitch.

While the foregoing description refers to illustrative embodiments, this description is not intended to be construed in a limiting sense. Various modifications and combinations of the illustrative embodiments will be apparent to persons skilled in the art upon reference to the description.

The invention claimed is:

1. A blade-pitch control system for controlling a pitch angle of each of a plurality of blades on a rotor, the blades being rotatably connected with blade grips to a yoke, the control system comprising:
    an input swashplate assembly having a non-rotating portion and a rotating portion, the rotating portion of the input swashplate assembly being operably connected to the blade grips;
    a feedback swashplate assembly having a non-rotating portion and a rotating portion, the rotating portion of the feedback swashplate assembly being coupled to the yoke and rotatably coupled to a mast, the feedback swashplate being configured to move in connection with the yoke during flapping of the yoke; and
    linear actuators connecting the non-rotating portion of the input swashplate assembly to the non-rotating portion of the feedback swashplate assembly, so as to transfer movement between the input swashplate and the feedback swashplate;
    wherein the pitch angle of the plurality of blades on the rotor are adjusted in relation to movement of the input swashplate.

2. The blade-pitch control system of claim 1, further comprising:
    an idler connected between each linear actuator and the non-rotating portion of the feedback swashplate assembly.

3. The blade-pitch control system of claim 1, wherein the linear actuators are rotatably mounted to the non-rotating portion of the feedback swashplate assembly.

4. The blade-pitch control system of claim 1, wherein the non-rotating portion of the feedback swashplate assembly is rotatably mounted to a member adapted to be rotatably carried on a mast.

5. The blade-pitch control system of claim 1, wherein the linear actuators are electric actuators.

6. The blade-pitch control system of claim 1, wherein the linear actuators are hydraulic actuators.

7. The blade-pitch control system of claim 1, wherein the linear actuators are electro-hydraulic actuators.

8. The blade-pitch control system of claim 1, wherein the Input swashplate assembly is outboard of the yoke.

9. The blade-pitch control system of claim 1, wherein the Input swashplate assembly is inboard of the yoke.

10. A method of incorporating flapping motion feedback to the control of a pitch angle of each of a plurality of blades on a rotor, the blades being rotatably connected with blade grips to a yoke, the method comprising:
    providing an input swashplate assembly having a non-rotating portion and a rotating portion, the rotating portion of the input swashplate assembly being operably connected to the blade grips;
    providing a feedback swashplate assembly having a non-rotating portion and a rotating portion, the rotating portion of the feedback swashplate assembly being rotatably coupled to the mast and connected to the yoke for movement with the yoke during flapping of the yoke;
    actuating linear actuators in response to movement of the yoke and feedback swashplate due to the flapping motion, the linear actuators being operably connected to the non-rotating portion of the input swashplate assembly and to the non-rotating portion of the feedback swashplate assembly, such that movement is induced in the input swashplate in response to the flapping motion; and
    adjusting the pitch of the blade grips and blades in response to the movement of the input swashplate, the blade grips and blades being rotatably coupled to the rotating portion of the input swashplate.

11. The method of claim 10, wherein idlers are used to transfer the motion from the feedback swashplate assembly to the input swashplate assembly.

12. The method of claim 10, wherein idlers are used to connect the feedback swashplate assembly to the linear actuators for transferring the motion from the feedback swashplate assembly to the input swashplate assembly.

13. An aircraft comprising a blade-pitch control system for controlling a pitch angle of each of a plurality of blades on a rotor, the blades being rotatably connected with blade grips to a yoke, the control system comprising:
    an input swashplate assembly having a non-rotating portion and a rotating portion, the rotating portion of the input swashplate assembly being operably connected to the blade grips;
    a feedback swashplate assembly having a non-rotating portion and a rotating portion, the rotating portion of the feedback swashplate assembly being connected to the yoke for movement with the yoke during flapping of the yoke; and
    linear actuators connecting the non-rotating portion of the input swashplate assembly to the non-rotating portion of the feedback swashplate assembly;
    wherein motion of the yoke and feedback swashplate during flapping causes a corresponding motion of the input swashplate assembly for providing selected pitch-flap coupling between flapping motion of the yoke and pitch motion of the grips.

14. The aircraft of claim 13, further comprising:
    an idler connected between each linear actuator and the non-rotating portion of the feedback swashplate assembly.

15. The aircraft of claim 13, wherein the linear actuators are rotatably mounted to the non-rotating portion of the feedback swashplate assembly.

16. The aircraft of claim 13, wherein the Input swashplate assembly is outboard of the yoke.

17. The aircraft of claim 13, wherein the Input swashplate assembly is inboard of the yoke.

18. The aircraft of claim 13, wherein simultaneous and identical motion in all of the linear actuators causes translation of the input swashplate along a mast axis.

19. The aircraft of claim 13, wherein dissimilar motion of the linear actuators causes tilting of the input swashplate about an axis perpendicular to a mast axis.

20. The aircraft of claim 13, wherein a pilot may generate a control input to operate the linear actuators.

* * * * *